United States Patent [19]
Lodochnikov et al.

[11] 3,806,783
[45] Apr. 23, 1974

[54] APPARATUS FOR CONTROLLING A DIRECT-CURRENT ELECTRIC MOTOR WITH A CONTACT-LESS COMMUTATOR ARRANGEMENT

[76] Inventors: Evald Akimovich Lodochnikov, ulitsa Kirova, 9, kv. 17; Viktor Petrovich Kolesnikov, Bulvar Pionerov, 20, kv. 10; Vladimir Egorovich Ageev, ulitsa Berezovaya roscha, 58, kv. 26; Vladimir Pavlovich Khizhnyak, ulitsa Krasnoarmeiskaya, 17, kv. 100; Vyacheslav Mikhailovich Polyakov, ulitsa Perevertkina, 58, kv. 90, all of Voronezh, U.S.S.R.

[22] Filed: Sept. 27, 1972

[21] Appl. No.: 292,804

[52] U.S. Cl............... 318/138, 318/254, 310/95
[51] Int. Cl............................................ H02k 29/02
[58] Field of Search...... 318/138, 254, 439; 310/68, 310/72, 94, 95, 108–110

[56] References Cited
UNITED STATES PATENTS
3,230,405  1/1966  Sorensen............................ 310/94

Primary Examiner—Bernard A. Gilheany
Assistant Examiner—Thomas Langer
Attorney, Agent, or Firm—Holman & Stern

[57] ABSTRACT

An apparatus for controlling a direct-current electric motor having a contact-less commutator, a rotor in the form of a permanent magnet and a stator with a three-phase winding is disclosed, said apparatus comprising a magnetic clutch of which the drive part is coupled with the output shaft of the motor and the driven part supports the rotor of a pickup responsive to the position of the rotor of the motor and the rotor of a braking electric machine, which is adapted to vary automatically the position of the axis of the magnetic flux of this rotor position pickup relative to the axis of the magnetic flux of the rotor of the motor and thus to adjust the speed of the motor. The apparatus ensures a high degree of stabilization of the motor speed within a wide range of controllable speeds and is employable, e.g. in various tape-driving mechanisms.

3 Claims, 7 Drawing Figures

APPARATUS FOR CONTROLLING A DIRECT-CURRENT ELECTRIC MOTOR WITH A CONTACT-LESS COMMUTATOR ARRANGEMENT

BACKGROUND OF THE INVENTION

The invention relates generally to apparatus for controlling a direct-current electric motor with a contact-less commutator arrangement and, more particularly, it relates to electric motors of which the speed is controllable within a wide range of rpm values, with a high degree of stabilization.

A direct-current electric motor is the best among electric motors, because it offers a possibility of infinite adjustment of the rotation speed thereof by a corresponding control action being exerted either on the excitation winding or on the armature winding.

However, notwithstanding its numerous known advantages, a traditional direct-current electric motor features the direct-current type of commutation of the supply current with the help of commutator rings and contact brushes, which affects the reliability and durability of the motor on account of a relatively rapid wear of the commutator and contact bushes, particularly, when the motor is operated under impact load conditions, which more often than not leads to excessive sparking and even appearance of a ring of fire about the commutator.

In order to eliminate these disadvantages, it has been prposed, when transistor devices made their appearance, to replace the commutator with the contact brushes by a semiconductor-type contact-less commutator controlled by a pickup responsive to the angular position of the rotor. The mechanical characteristic of a direct-current electric motor remains unaffected by such replacement of the commutator with contact brushes by a contact-less commutator.

However, auxiliary means are needed to maintain a constant speed of the motor throughout the variations of the supply voltage or of the load applied to the motor, as well as to vary the speed of the motor in accordance with a predetermined pattern.

There is known a method of controlling the speed of a direct-current electric motor with a contact-less commutator by varying the relative position of the axis of the magnetic flux of the pickup responsive to the position of the rotor of the motor and the axis of the magnetic flux of the rotor of the motor, for which purpose delay means are introduced into the circuit controlling the performance of this rotor position pickup.

There is known another method of controlling the speed of a direct-current electric motor with a contact-less commutator by introducing an auxiliary control over the performance of the commutator, e.g. with the help of a pulse-width modulator.

There is yet another known method of controlling the speed of a direct-current electric motor with a contact-less commutator by adjusting automatically the value and the phase of the voltage supplied to the windings of the motor.

There is still another known method of controlling the speed of a direct-current electric motor with a contact-less commutator by starting and accelerating the motor under the influence of the pickup responsive to the angular position of the rotor of the motor, with subsequent disconnection of the pickup and connection of the motor to a stabilized source of variable frequency.

There is a known apparatus for controlling a direct-current electric motor with a contact-less commutator, comprising a magnetoelectric motor, a master oscillator, a control member, a semi-conductor commutator effecting commutation of the current supplied to the phases of the motor under the influence of signals of the pickup responsive to the angular position of the rotor of the motor, coming from the secondary windings of this pickup, and a source of power supply of the pickup, a semi-conductor switching circuit controlled by a phase-responsive member and a feedback arrangement.

There is also known an apparatus for controlling a direct-current electric motor with a contact-less commutator, comprising a magnetoelectric motor, a pickup responsive to the position of the rotor of the motor, associated with a master oscillator, a pickup responsive to the speed of the motor, a semi-conductor switching circuit and a trigger circuit with three stable states.

There is further known a multi-phase direct-current electric motor with a contact-less commutator, a control unit associated with said commutator, a pickup responsive to the position of the rotor of the motor, having a single-phase output, and a phase-controlling unit including a rectangular pulse generator.

The three last-mentioned apparatus have been developed by the USSR Research and Design Institute of Electromechanics, with the employment of electronic means; however, these apparatus at the present level of semi-conductor techniques involve comparatively complicated control over the contact-less commutator and do not always ensure the required dynamic characteristics of the motors within a wide range of speed adjustment, which, nevertheless, does not deprive these apparatus of their truly advantageous features.

There is also known an apparatus for controlling a direct-current electric motor with a contact-less commutator; comprising a magnetoelectric motor, a rotor position pickup with Hall devices, a hysteresis-type tachogenerator employed as a speed feedback pickup and a phase--responsive rectifier (see the Works of the All-Union Conference on Low-Power Electric Motors, Part 1, 1969, pp. 246–250, published by the Electrodynamics Institute, Academy of Sciences of the Ukrainian SSR). The hysteresis tachogenerator satisfies all the requirements concerning a feedback arrangement. The disadvantage of this tachogenerator is the low value of the jump of its output signal, which necessitates the use of additional means for amplifying this signal for its subsequent employment in the phase-responsive rectifier, whereby the structure of the control circuit becomes rather complicated.

SUMMARY OF THE INVENTION

It is an object of the present invention to simplify the control circuit and to reduce the size thereof.

The essence of the present invention is the novel structure of a contact-less direct-current electric motor, wherein a hysteresis electric machine is employed for direct automatic control of the motor speed.

This becomes possible owing to the apparatus comprising, in addition to the pickup responsive to the rotor position and the hysteresis electric machine, a magnetic clutch of which the drive part is coupled with the shaft of the motor and of which the driven part supports the rotor of the pickup and the rotor of the hysteresis electric machine, the stator of this machine and the stator of the rotor position pickup making up an integral structure mounted on the housing of the motor.

By varying the angle between the drive and driven parts of the magnetic clutch (by braking the clutch with the help of the hysteresis machine) it becomes possible to vary the angle between the axis of the magnetic flux of the rotor position pickup and the axis of the magnetic flux of the rotor of the motor and thus to control the motor speed.

It is advisable for the rotor of the pickup responsive to the angular position of the rotor of the motor to include two segments, one of said two segments being rigidly secured on the shaft of the motor and the other one of said segments being rigidly secured on the driven part of the magnetic clutch, which makes it possible to control simultaneously the width of the control signal and the position of the axis of the magnetic flux of the rotor position pickup relative to the axis of the magnetic flux of the rotor of the electric motor, whereby the motor speed is controlled more economically.

It is alternatively advisable to have the rotor of the pickup responsive to the angular position of the rotor of the electric motor to include three segments, one of said segments being rigidly mounted on the rotor shaft of the motor, this one segment carrying a spindle rotatably supporting the other two segments, said two segments being positionable by means of a cam-shaped projection disposed below said segments and associated with the driven part of the magnetic clutch, this cam-shaped projection being adapted to spread the segments angularly, whereby it becomes possible to adjust the width of the control signal without affecting the relative position of the axis of the magnetic flux of the rotor position pickup and the axis of the magnetic flux of the rotor of the motor and thus to attain the most economical mode of control of the motor speed.

The invention has made it possible to re-arrange, and that with a minimal loss of time and labour, serially produced unadjustable direct-current electric motors with contact-less commutators into stabilized electric motors, both single-speed ones and those having their speed adjustable within a wide range with a high degree of stabilization, this re-arranged motors being employable, e.g. in various tape-driving mechanisms. The range of the power output of these motors is within 1.5 W to 100 W, and the speed adjustment range is from 600 rpm to 10.000 rpm. The motors have demonstrated reliable and stable performance with the supply voltage varying within a ±30 percent range and with the load varying from 0% to 130%.

BRIEF DESCRIPTION OF THE DRAWINGS

The invention will be better understood from the following detailed description wherein reference is being had to the appended drawings, specific terms and expressions being used for the sake of clarity. It should be understood, however, that the invention is in no way meant to be limited by these specific terms and expressions which are intended to embrace all the equivalent elements operating in a similar manner and usable for purposes similar to those of the present invention.

It should be also borne in mind that other objects and advantages of the present invention will be made apparent in the disclosure to follow and in the appended drawings, wherein.

DETAILED DESCRIPTION OF THE PREFERRED EMBODIMENT

Figure 1:
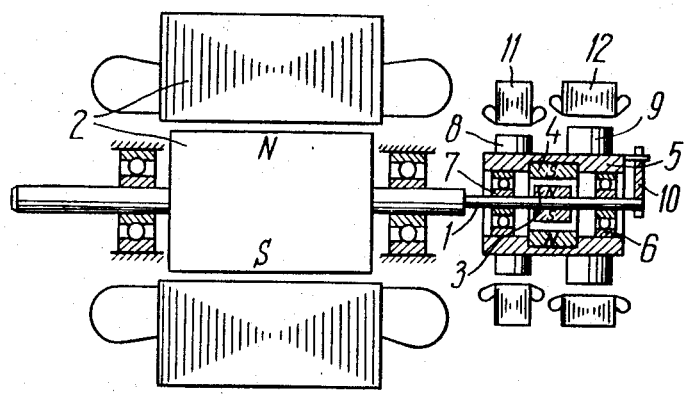
FIG. 1 is a schematic view of a direct-current electric motor with a contact-less commutator, controllable by varying the position of the axis of the magnetic flux of the transformer-type pickup responsive to the angular position of the rotor of the motor relative to the axis of the magnetic flux of the rotor of this motor.
Figure 4:
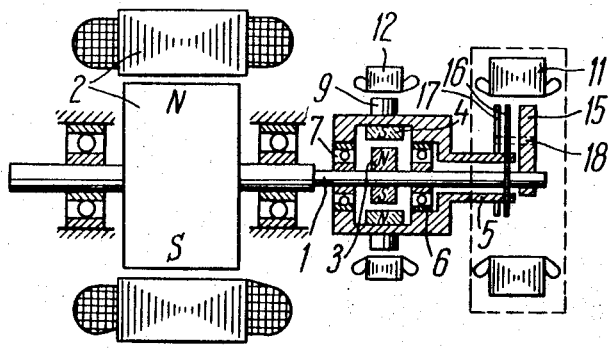
FIG. 4 is a schematic view of a direct-current electric motor with a contact-less commutator, controllable by varying the position of the axis of the magnetic flux of the rotor position pickup relative to the axis of the magnetic flux of the rotor of the motor, with simultaneous variation of the width of the control signal.

Referring now in particular to the appended drawings, the output shaft 1 (FIG. 1) of a magnetoelectric motor 2 is mounted on drive part 3 of a clutch including permanent magnets, while the driven part 4 of the same clutch is disposed on a hollow shaft 5 and is journalled on bearings 6 and 7. The hollow shaft 5 has secured thereon the rotor 8 of a pickup responsive to the angular position of the rotor of the electric motor 2, to be hereinafter referred to as the "rotor position pickup," and the rotor of a braking arrangement 9. A member 10 limiting the rotation of the clutch is mounted on the free end of the output shaft 1. The stator 11 of the rotor position pickup and the stator 12 of the braking arrangement are assembled as an integral structure mounted on the housing of the motor 2.

Figures 2, 7:
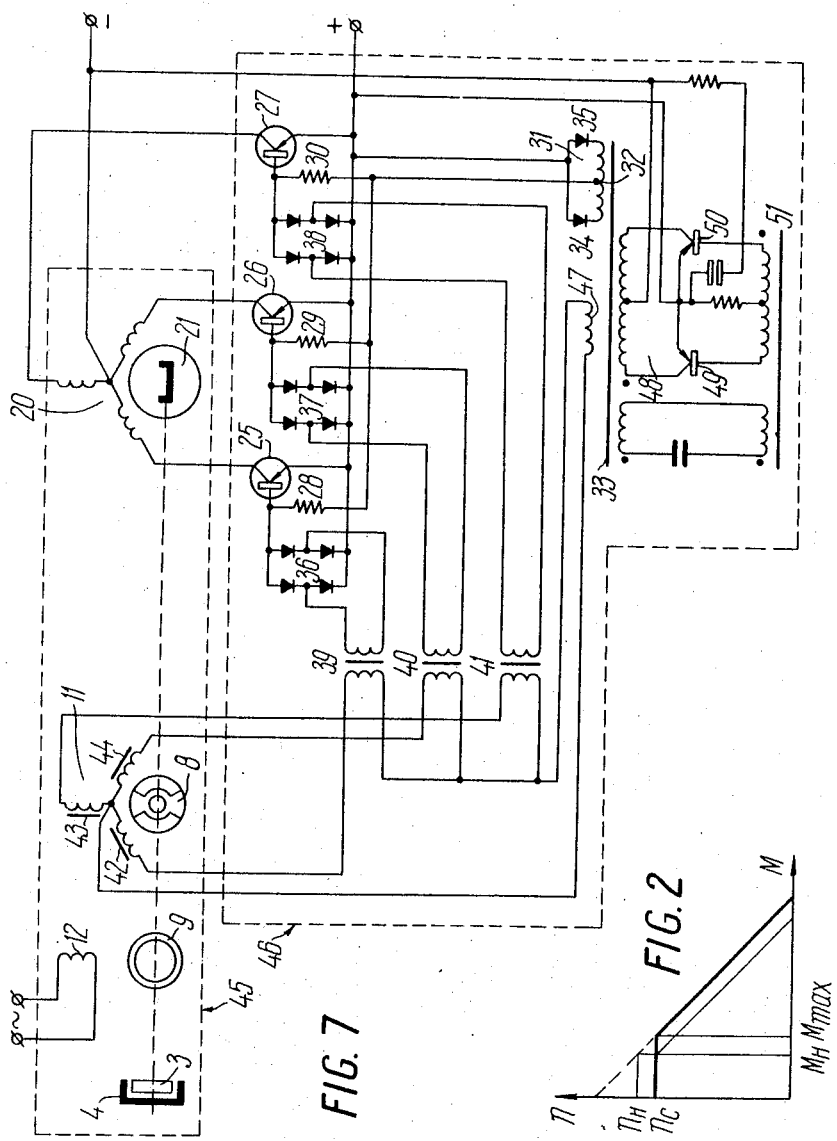
FIG. 2 illustrates the mechanical characteristic of the motor illustrated in FIG. 1.
FIG. 7 is a circuit diagram of the direct-current electric motor with a contact-less commutator, constructed in accordance with the schematic view shown in FIG. 1.

The herein described electric motor operates, as follows. When a direct-current voltage is supplied to the contact-less commutator of the motor, an alternating-current voltage is simultaneously supplied to the stator of the braking arrangement, which can be in the form of hysteresis electric machine. The stator of the rotor position pickup is pre-adjusted for the relative position of the rotor of the rotor position pickup and the rotor of the electric motor to ensure such sequence and timing of connection of the phases of the motor to the power supply source, that the interaction of the magnetic fluxes of the motor stator and of the motor rotor yields maximal driving torque. Sequential switching of the phases of the motor winding is effected by the contact-less commutator in accordance with the signals sent by the rotor position pickup. When the electric motor is accelerated to a speed equal to the synchronous speed "$n_s$" (FIG. 2) of the hysteresis machine 9, 12, the excessive electromagnetic driving torque of the motor (meaning that the load torque $M_n$ is below the maximal driving torque $M_{max}$ of the motor, corresponding to this speed $n_s$) tends to accelerate the rotor of the motor to a speed $n_n$, corresponding to the load torque $M_n$, whereby the rotor, accelerating, drives along the rotor of the rotor position pickup through the synchronous clutch. Now the hysteresis machine starts operating in a current-generating mode and, consequently, develops a braking torque, which results in the rotor of the hysteresis machine and the rotor of the rotor position pickup, rigidly connected to the rotor of the hysteresis machine, rotating through a maximal angle, offered by the clutch, in relation to the rotor of the electric motor. Correspondingly, the angle between the axis of the magnetic flux of the rotor position pickup and the axis of the magnetic flux of the rotor of the electric motor is varied. The relative rotation continues, until the rotor position pickup acquires a position at which the driving torque developed by the electric motor at the speed corresponding to the synchronous speed of the hysteresis machine equals the load torque. Should the load applied to the shaft of the electric motor vary, the angle between axis of the magnetic flux of the rotor position pickup and the axis of the magnetic flux of the rotor of the motor is automatically varied correspondingly in the above-described way, whereby the rotation speed of the electric motor remains, equal to the synchronous speed of the hysteresis machine (the speed $n_s$). When the load rises, and the load torque Mhd n becomes greater than the maximal driving torque of the motor at the given speed, the rotor of the electric motor is braked and draws along, through the synchronous clutch, the rotor of the rotor position pickup. The hysteresis machine starts operating in a driving mode. The driving torque of the hysteresis machine operating in the driving mode being smaller than the torque of the synchronous clutch, the rotor of the rotor position pickup and the rotor of the hysteresis machine will slow down in synchronism with the rotor of the electric motor.

By varying the frequency of the power supply of the hysteresis machine it is possible to vary the synchronous speed thereof, and, therefore, to vary the synchronous speed of the electric motor.

Figure 3:
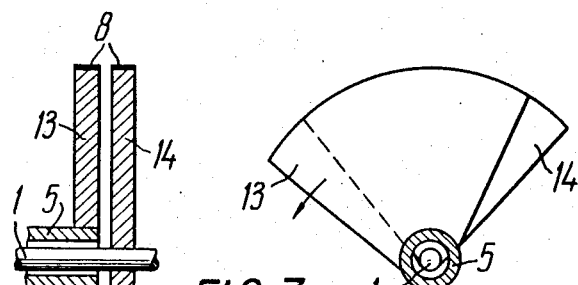
FIG. 3 illustrates a first modification of the rotor of the pickup responsive to the position of the rotor of the motor.

Illustrated in FIG. 3 is the rotor 8 of the rotor position pickup, made in the form of two segments of which one segment 13 is rigidly secured on the hollow shaft 5, and the other segment 14 is fast with the output shaft 1 of the electric motor.

When the rotor 9 of the hysteresis machine is braked, the width of the signal generated by the segments 13 and 14 of the rotor 8 of the rotor position pickup is varied. This provides for adjustment of the speed of the electric motor on account of variation of the relative position of the axis of magnetic flux of the rotor position pickup and the magnetic flux of the rotor of the electric motor, with simultaneous variation of the control signal.

Figure 5:
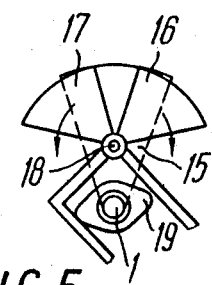
FIG. 5 illustrates a second modification of the rotor of the pickup responsive to the position of the rotor of the motor.

FIG. 5 illustrates a modification of the rotor of the rotor position pickup, including three segments 15, 16 and 17. The first segment 15 is fast with the rotor shaft of the electric motor and carries a spindle 18 rotatably supporting the two other segments 16 and 17. The two segments 16 and 17 are rotatable relative to each other by means of a cam-shaped projection 19 on the hollow shaft 5, below the segments. When the rotor 9 of the hysteresis machine is braked, the width of the signal originated at the segments of the rotor of the rotor position pickup is varied. In this way the speed of the electric motor is controlled by varying the width of the control signal, which is the most economical way; but, however, the structure illustrated in FIG. 5 is more complicated than that illustrated in FIG. 3.

Figure 6:
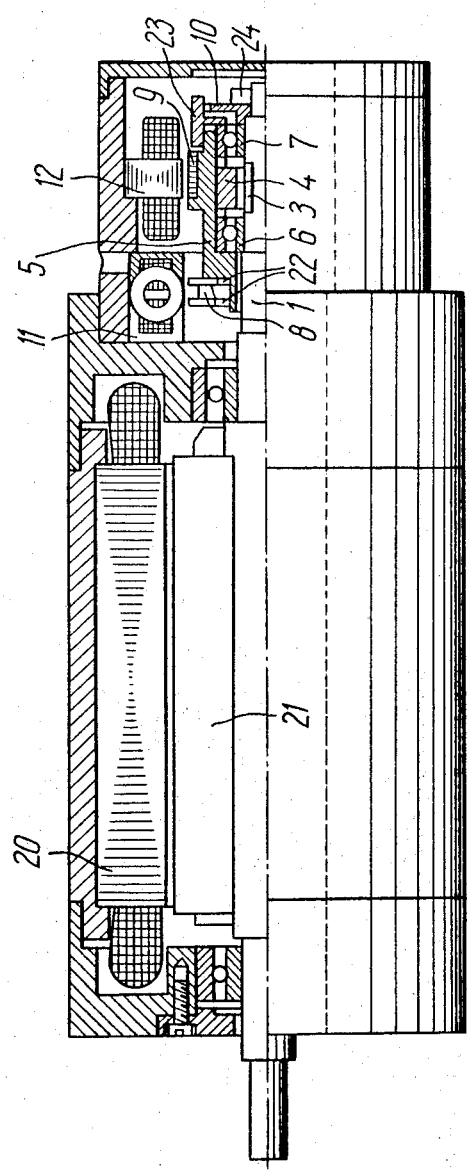
FIG. 6 shows schematically the structure of a direct-current electric motor with a contact-less commutator, constructed in accordance with the schematic view shown in FIG. 1.

The structure of one possible embodiment of an electric motor of which the speed can be controlled in the manner illustrated in connection with the schematic view in FIG. 1 is, as follows. The electric motor includes a stator 20 (FIG. 6) in the slots of which there is mounted in three-phase winding, and a rotor 21 in the form of a permanent magnet. The external end of the rotor shaft 1 carries the drive part 3 of a magnetic clutch in the form of a pair of permanent magnets adhesive-bound to the respective portions of the shaft, milled for the attachment of these magnets. The hollow shaft 5 carries the rotor 8 of the rotor position pickup, the rotor including a permanent magnet magnetized in the axial direction and segment-shaped magnetically-soft pices 22. The angular extent of the segment determines the width of th control signal. The hollow shaft also carries the rotor 9 of the braking arrangement, the rotor including an assembly of rings made of a material with hysteresis-type magnetization.

The hollow shaft 5 supports the bearings 6 and 7 intermediate of which there is mounted the driven part 4 of the magnetic clutch, including a two-pole annular magnet magnetized in the radial direction. The bearings 6 and 7 and the driven part 4 of the clutch are retained by a special-design nut. The entire structure of the rotor is retained by the limiting member 10 and by a nut 24. The limiting member 10 has a groove cut therein, adapted to receive a projection integral with a nut 23. In this way the magnetic clutch is protected against tumbling when the electric motor is started.

The stator 11 of the rotor position pickup and the stator 12 of the braking arrangement are mounted on a common housing secured in the housing of the electric motor. The stator 12 of the braking arrangement is in the form of the stator of an alternating-current electric machine, having slots receiving a single-phase winding. The stator 11 of the rotor position pickup includes three saturation chokes having ferrite members with a rectangular hysteresis loop, the ferrite members being received within a plastic case and embedded in a compound composition.

The three-phase winding of the low-power electric motor (FIG. 7) is star-connected and has the zero point thereof connected to the negative terminal of the power supply source, the phases of the winding being connected to the respective collectors of the power amplifiers including power transistor triodes 25, 26 and 27 connected into a common-emitter circuit, the emitters of the transistors being connected to the positive terminal of the power supply source. Connected in series intermediate of the respective bases and emitters of the transistors 25, 26 and 27 are resistors 28, 29 and 30 and an auxiliary low-voltage direct-current source 31 associated with the secondary winding 32 of a transformer 33 and diodes 34, 35.

Provided at the input of the power transistors 25, 26 and 27 are rectifiers 36, 37 and 38 intended to rectify the alternating-current voltage coming from the secondary windings of the transformers 39, 40 and 41 associated with the rotor position pickup, i.e. with the pickup responsive to the angular position of the rotor of the electric motor. The stator 11 of the rotor position pickup includes saturation chokes 42, 43 and 44. In order to bring down the amount of connection leads between the electric motor 45 and the commutator 46 thereof, the windings of the chokes 42, 43 and 44 of the stator of the rotor position pickup are connected in series with the primary windings of the transformers 39, 40 and 41 and are supplied with electric power from a variable frequency source 47.

The saturation chokes 42, 43 and 44 and the transformers 39, 40 and 41 have ferrite cores with rectangular hysteresis loop magnetization, which provides for the most economical mode of the operation of the pickup and ensures sufficient steepness of the output signal thereof, whereby the output signal can control directly the power transistors 25, 26 and 27.

The power supply generator 48 of the pickup includes transistors 49, 50 and also makes use of the transformers 33 and 51.

The frequency generated by this generator is about 50 to 70 kilocycles per second. The bases of the transistors 49 and 50 are connected to the winding of the transformer 51, while the collector thereof is connected to the windings of the transformer 33.

What we claim is:

1. An apparatus for controlling a direct-current electric motor having a contact-less commutator, a rotor in the form of a permanent magnet and a stator with a three-phase winding, said apparatus comprising:
    a semiconductor commutator connected to a power supply;
    a rotor-position pick-up having a stator and a rotor, said rotor-position pick-up being responsive to the angular position of said rotor of said electric motor and generating a control signal for switching on successively the phases of said electric motor stator winding;
    said electric motor being connected to said rotor-position pick-up via said semiconductor commutator;
    a braking electric machine having a stator and a rotor, said stator of said braking electric machine and said stator of said rotor-position pick-up being made as an integral structure and mounted on the housing of said electric motor; and
    a magnetic clutch having a drive part and a driven part, said drive part of said clutch being rigidly secured on the shaft of said electric motor and said driven part of said clutch mounting said rotor of said rotor-position pick-up and said rotor of said braking electric machine, thereby making it possible to vary the angle between the axis of the magnetic flux produced by said rotor-position pick-up and the axis of the magnetic flux generated by said rotor of said electric motor for controlling the rotational speed of said electric motor.

2. An apparatus for controlling a direct-current electric motor having a contact-less commutator as claimed in claim 1, wherein said rotor of said rotor-position pick-up includes two segments, one of said segments being rigidly coupled with the shaft of said electric motor and the other one of said segments being mounted on said driven part of said clutch, thereby making it possible to adjust simultaneously the width of the control signal and the position of the axis of the magnetic flux produced by said rotor-position pick-up of said electric motor with respect to the axis of the magnetic flux generated by said rotor of said electric motor for controlling the rotational speed of said electric motor.

3. An apparatus for controlling a direct-current electric motor having a contact-less commutator as claimed in claim 1, wherein said rotor of said rotor-positioned pick-up includes three segments, one of said segments being rigidly mounted on the shaft of said electric motor rotor, said one segment carrying a spindle rotatably supporting the other two of said three segments, and a cam-shaped projection is disposed below said other two segments and coupled with said driven part of said clutch for rotating said other two segments relative to each other, thereby making it possible to automatically control the width of the control signal without affecting the relative position of the axis of the magnetic flux produced by said rotor-position pick-up of said electric motor with respect to the axis of the magnetic flux generated by said rotor of said electric motor for controlling the rotational speed of said electric motor.

* * * * *